US008456605B2

(12) United States Patent
Lim et al.

(10) Patent No.: US 8,456,605 B2
(45) Date of Patent: Jun. 4, 2013

(54) FLAT DISPLAY PANEL

(75) Inventors: Dae-Ho Lim, Yongin (KR); Il-Kwon Jeon, Yongin (KR); Joo-Heon Kim, Yongin (KR); Jang-Hwan Shin, Yongin (KR); Jung-Hwan Byun, Yongin (KR); Jeong-Hun Park, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 314 days.

(21) Appl. No.: 12/771,012

(22) Filed: Apr. 30, 2010

(65) Prior Publication Data

US 2010/0277855 A1 Nov. 4, 2010

(30) Foreign Application Priority Data

Apr. 30, 2009 (KR) ........................ 10-2009-0038452

(51) Int. Cl.
*G02F 1/1333* (2006.01)

(52) U.S. Cl.
USPC .......................................................... 349/160

(58) Field of Classification Search
None
See application file for complete search history.

(56) References Cited

U.S. PATENT DOCUMENTS

| | | | | |
|---|---|---|---|---|
| 6,088,069 | A * | 7/2000 | Farlow | 349/12 |
| 2008/0204619 | A1 * | 8/2008 | Saitou et al. | 349/43 |

FOREIGN PATENT DOCUMENTS

| | | | |
|---|---|---|---|
| JP | 53059389 U | 5/1978 | |
| JP | 56055874 U | 5/1981 | |
| JP | 63165683 U | 10/1988 | |
| JP | 02127620 | 5/1990 | |
| JP | 07152045 A | 6/1995 | |
| JP | 2000090840 | 3/2000 | |
| JP | 2003-283119 A | 10/2003 | |
| JP | 2003330005 | 11/2003 | |
| JP | 2005077980 A | 3/2005 | |
| JP | 2005134637 A | 5/2005 | |
| JP | 2005338589 A | 12/2005 | |
| JP | 2007178801 | 7/2007 | |
| KR | 2002-0060656 A | 7/2002 | |
| KR | 10-2006-0056755 | 5/2006 | |
| KR | 10-2007-0063242 | 6/2007 | |

OTHER PUBLICATIONS

Korean Office Action dated Oct. 25, 2010, issued in corresponding Korean Patent Application No. 10-2009-0038452.
Japanese Office Action issued by Japanese Patent Office on Feb. 28, 2012 in connection with Japanese Patent Application Serial No. 2010-105285, which also claims Korean Patent Application Serial No. 10-2009-0038452 as its priority document and Request for Entry of the Accompanying Office Action attached herewith.
Registration Determination Certificate issued by Korean Intellectual Property Office on Aug. 29, 2011, corresponding to KR 10-2009-0038452 and Request for Entry attached herewith.

(Continued)

*Primary Examiner* — Tina Wong
(74) *Attorney, Agent, or Firm* — Robert E. Bushnell, Esq.

(57) ABSTRACT

A flat display panel having a first substrate, a display unit disposed on the first substrate, a second substrate disposed on the first substrate to cover the display unit and not covering a predetermined region of the first substrate, a terminal unit disposed on the predetermined region of the first substrate and is electrically connected to the display unit, and a glass strengthener coated on the first substrate and adjacent to the second substrate at a location to increase the strength of the first substrate. The flat display panel having the substrate on which a terminal unit is formed has increased strength.

20 Claims, 3 Drawing Sheets

OTHER PUBLICATIONS

Japanese Office Action issued Jun. 19, 2012 in connection with Japanese Patent Application Serial No. 2010-105285, which also claims Korean Patent Application Serial No. 10-2009-0038452 as its priority document, and Request for Entry of the Accompanying Office Action attached herewith.

* cited by examiner

FLAT DISPLAY PANEL

CROSS-REFERENCE TO RELATED APPLICATIONS

This application claims the benefit of Korean Application No. 10-2009-0038452, filed Apr. 30, 2009, in the Korean Intellectual Property Office, the disclosure of which is incorporated herein by reference.

BACKGROUND OF THE INVENTION

1. Field of the Invention

Aspects of the present invention relate to a flat display panel, and more particularly, to a flat display panel in which a substrate on which a terminal unit is formed has increased strength.

2. Description of the Related Art

A flat display panel includes a first substrate on which a display unit is disposed and a second substrate that contacts the first substrate and seals the display unit. A pad unit is electrically connected to the display unit and is disposed on the first substrate. A portion of the first substrate where the pad unit is formed is not covered by the second substrate and is not covered by the second substrate. That is, the portion of the first substrate where the pad unit is formed is formed of a single substrate and does not contact the second substrate. Accordingly, the portion of the first substrate where the pad unit is formed has strength weaker than other portions of the first substrate, and thus may be easily damaged by an external impact.

SUMMARY OF THE INVENTION

Aspects of the present invention provide a flat display panel in which a substrate has increased strength.

According to an aspect of the present invention, there is provided a flat display panel including a first substrate; a display unit disposed on the first substrate; a second substrate disposed on the first substrate to cover the display unit and not covering a predetermined region of the first substrate; a terminal unit disposed on the predetermined region of the first substrate and is electrically connected to the display unit; and a glass strengthener coated on the first substrate and adjacent to the second substrate at a location to increase strength of the first substrate.

According to an aspect of the present invention, the glass strengthener may be coated on the predetermined region of the first substrate.

According to an aspect of the present invention, the glass strengthener may be coated to cover the terminal unit.

According to an aspect of the present invention, the glass strengthener may be coated on a region separating the second substrate from the predetermined region of the first substrate and on the predetermined region.

According to an aspect of the present invention, the flat display panel may further include a desiccating agent coated on the glass strengthener that is coated on the predetermined region.

According to an aspect of the present invention, the glass strengthener may be coated on the region separating the second substrate from the predetermined region.

According to an aspect of the present invention, the flat display panel may further include a desiccating agent that is coated on the predetermined region.

According to an aspect of the present invention, the desiccating agent may be coated to cover the terminal unit.

According to an aspect of the present invention, the flat display panel may further include a desiccating agent covering the terminal unit, wherein the glass strengthener is coated to cover the desiccating agent.

According to an aspect of the present invention, the glass strengthener may be coated to cover the region separating the second substrate from the predetermined region and the desiccating agent.

According to an aspect of the present invention, the flat display panel may further include a flexible printed circuit substrate electrically connected to the terminal unit.

In a flat display panel according to an embodiment of the present invention, the strength of the substrate can be increased.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
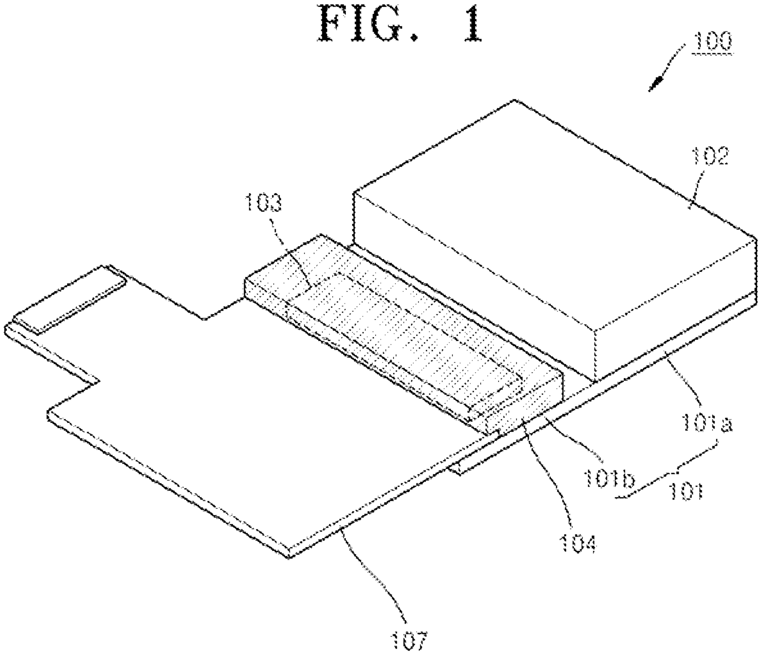
FIG. 1 is a schematic perspective view of a flat display panel according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As referred to herein, when a first element is said to be disposed or formed "on" a second element, the first element can directly contact the second element, or can be separated from the second element by one or more other elements located therebetween. In contrast, when an element is referred to as being disposed or formed "directly on" another element, there are no intervening elements present.

FIG. 1 is a schematic perspective view of a flat display panel 100 according to an embodiment of the present invention. Referring to FIG. 1, the flat display panel 100 includes a first substrate 101, a second substrate 102, a terminal unit 103, a glass strengthener 104, and a flexible printed circuit substrate 107.

A display unit (not shown) is disposed on a region 101*a* of the first substrate 101. The second substrate 102 is disposed on the first substrate 101 covering the display unit. The first substrate 101 and the second substrate 102 are joined by a sealant (not shown), and the display unit is sealed by the second substrate 102. The second substrate 102 is disposed so as to not cover a region 101*b* of the first substrate 101.

The terminal unit 103 is disposed on the region 101*b* of the first substrate 101. The terminal unit 103 is electrically connected to the display unit and the flexible printed circuit substrate 107. External power and signals are transmitted to the display unit through the flexible printed circuit substrate 107 and the terminal unit 103.

The glass strengthener 104 is formed on the region 101*b* of the first substrate 101 to cover the terminal unit 103. In the case of a flat display panel, the region 101*b* of the first substrate 101 is not covered by the second substrate 102 so that the terminal unit 103, which electrically connects a display unit (not shown) and a flexible printed circuit substrate 107, can be disposed thereupon. The region 101*b* of the first substrate 101 where the terminal unit 103 is disposed is not a region where the first substrate 101 and the second substrate 102 are joined, but rather is a single substrate (the first substrate 101), and thus is weak to external impact. Thus, in the flat display panel 100 according to an embodiment of the present invention, the exposed region 101*b* of the first substrate 101 where the terminal unit 103 is disposed is strengthened by the glass strengthener 104. The glass strengthener 104 may be formed on the region 101*b* of the first substrate 101 in order to completely cover the terminal unit 103. While not required in all aspects, the strengthener 104 can be formed by coating the terminal unit 103 while attached to the region 101*b*, or can be separately formed and connected to the terminal unit 103 and/or region 101*b*. Examples of the glass strengthener 104 include metal glazes, silicon oxide, tin oxide, ceramic coatings, strengthening polymers or other similar compounds or materials, however, aspects of the present invention are not limited thereto.

Figure 2:
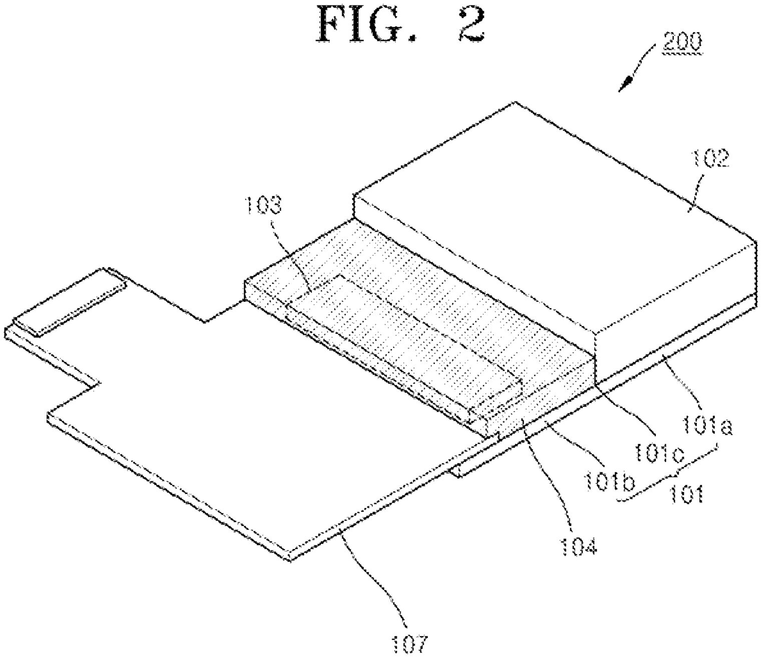
FIG. 2 is a schematic perspective view of a flat display panel according to another embodiment of the present invention.

FIG. 2 is a schematic perspective view of a flat display panel 200 according to another embodiment of the present invention. Referring to FIG. 2, in the flat display panel 200, a region of the first substrate 101 where the glass strengthener 104 is formed different from that of the flat display panel 100 of FIG. 1.

More specifically, in the flat display panel 200, the glass strengthener 104 is not only formed on the region 101*b* of the first substrate 101, but also is formed on a region 101*c* separating the second substrate 102 from the region 101*b* of the first substrate 101. When the glass strengthener 104 is formed on the region 101*b* of the first substrate 101 and the region 101*c* separating the second substrate 102 from the region 101*b* of the first substrate 101, the glass strengthener 104 is formed to cover the terminal unit 103. With further forming of the glass strengthener 104, the region 101*b* of the first substrate 101 is strengthened.

Figure 3:
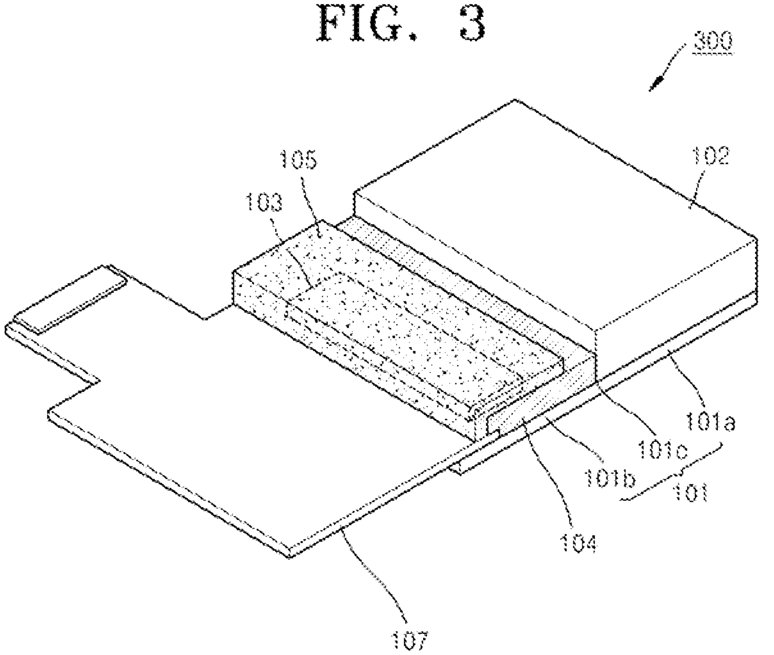
FIG. 3 is a schematic perspective view of a flat display panel according to another embodiment of the present invention.

FIG. 3 is a schematic perspective view of a flat display panel 300 according to another embodiment of the present invention. Referring to FIG. 3, in the flat display panel 300, a desiccating agent 105 is formed on the glass strengthener 104 of the flat display panel 200 according to another embodiment of the present invention.

More specifically, after forming the glass strengthener 104 on the region 101*b* of the first substrate 101 and the region 101*c* separating the second substrate 102 from the region 101*b* of the first substrate 101, the desiccating agent 105 is formed on the glass strengthener 104 formed on the region 101*b* of the first substrate 101. Thus, according to another embodiment of the present invention, the region 101*b* of the first substrate 101 is strengthened by the glass strengthener 104 and the desiccating agent 105 can prevent wires (not shown) of the terminal unit 103 from corroding. While not required, it is understood that the desiccating agent 105 can be coated on the formed glass strengthener 104. Examples of the desiccating agent 105 include silica gels, molecular sieves such as aluminosilicate minerals, zeolites, and active carbons, and activated alumina, however aspects of the present invention are not limited thereto.

Figure 4:
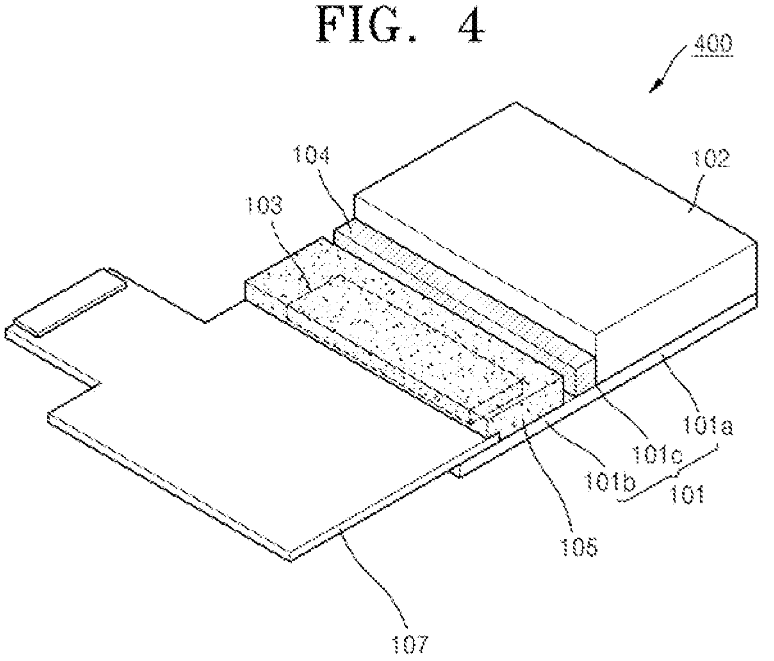
FIG. 4 is a schematic perspective view of a flat display panel according to another embodiment of the present invention.

FIG. 4 is a schematic perspective view of a flat display panel 400 according to another embodiment of the present invention. Referring to FIG. 4, in the flat display panel 400, the glass strengthener 104 is formed on the region 101*c* separating the second substrate 102 from the region 101*b* of the first substrate 101, but is not formed on the region 101*b* of the first substrate 101 where the terminal unit 103 is disposed. In addition, the desiccating agent 105 is formed on the region 101*b* of the first substrate 101, and preferably, the desiccating agent 105 is formed on the region 101*b* of the first substrate 101 in order to cover the terminal unit 103. The corrosion of wires of the terminal unit 103 can be prevented since the desiccating agent 105 covers the terminal unit 103, and the strength of the first substrate 101 can be increased by the glass strengthener 104.

Figure 5:
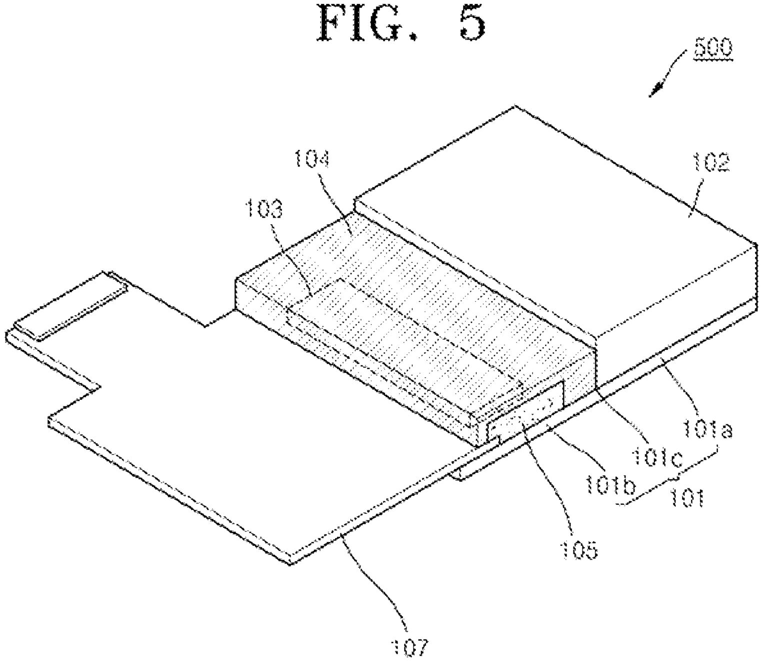
FIG. 5 is a schematic perspective view of a flat display panel according to another embodiment of the present invention.

FIG. 5 is a schematic perspective view of a flat display panel 500 according to another embodiment of the present invention. Referring to FIG. 5, in the flat display panel 500, the glass strengthener 104 is formed on a region where the desiccating agent 105 is formed and on the region 101*c* separating the second substrate 102 from the region 101*b* of the first substrate 101. More specifically, the desiccating agent 105 is formed on the region 101*b* of the first substrate 101 to cover the terminal unit 103. Afterwards, the glass strengthener 104 is formed on the desiccating agent 105 and the region 101*c* separating the second substrate 102 from the region 101*b* of the first substrate 101. The desiccating agent 105 can prevent the wires of the terminal unit 103 from corrosion, and the glass strengthener 104 can further increase the strength of the first substrate 101 since the glass strengthener 104 is formed on the desiccating agent 105 and the region 101*c* separating the second substrate 102 from the region 101*b* of the first substrate 101.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A flat display panel comprising:

a first substrate;

a display unit disposed on the first substrate;

a second substrate disposed on the first substrate to cover the display unit and not covering a predetermined region of the first substrate;

a terminal unit disposed on the predetermined region of the first substrate and electrically connected to the display unit; and a glass strengthener coated on a portion of the first substrate and adjacent to the second substrate at a location where the first substrate and the second substrate are not overlapped with each other to increase the strength of the first substrate.

2. The flat display panel of claim 1, wherein the glass strengthener is coated on the predetermined region of the first substrate.

3. The flat display panel of claim 2, wherein the glass strengthener is coated to cover the terminal unit.

4. The flat display panel of claim 1, wherein the glass strengthener is coated on a region separating the second substrate from the predetermined region and on the predetermined region.

5. The flat display panel of claim 4, further comprising a desiccating agent coated on the glass strengthener that is coated on the predetermined region.

6. The flat display panel of claim 1, wherein the glass strengthener is coated on the region separating the second substrate from the predetermined region.

7. The flat display panel of claim 6, further comprising a desiccating agent that is coated on the predetermined region of the first substrate.

8. The flat display panel of claim 7, wherein the desiccating agent is coated to cover the terminal unit.

9. The flat display panel of claim 1, further comprising a desiccating agent to cover the terminal unit, wherein the glass strengthener is coated to cover the desiccating agent.

10. The flat display panel of claim 9, wherein the glass strengthener is coated to cover the region separating the second substrate from the predetermined region and the desiccating agent.

11. The flat display panel of claim 1, further comprising a flexible printed circuit substrate electrically connected to the terminal unit.

12. A method of increasing the strength of a first substrate of a flat display panel, the method comprising:

attaching a terminal unit to a non-display area of the first substrate adjacent to a display area of the first substrate on which a display unit is disposed; and forming a glass strengthener on the non-display area of the first substrate.

13. The method of claim 12, further comprising forming a desiccating agent on the terminal unit, wherein the step of forming the glass strengthener comprises covering the terminal unit with the glass strengthener.

14. The method of claim 13, wherein the desiccating agent is formed on the glass strengthener.

15. The method of claim 13, wherein the glass strengthener is formed on the desiccating agent.

16. A method of preventing corrosion of a terminal unit of a flat display panel, the method comprising:

attaching a terminal unit to a non-display area of a first substrate adjacent to a display area of the first substrate on which a display unit is disposed; and forming a desiccating agent on the terminal unit to prevent corrosion of the terminal unit.

17. The method of claim 16, further comprising:

forming a glass strengthener on the non-display area of the first substrate to increase the strength of the first substrate.

18. The method of claim 17, wherein the step of forming the glass strengthener comprises covering the first substrate and the terminal unit with the glass strengthener.

19. The method of claim 18, wherein the glass strengthener is formed between the desiccating agent and the terminal unit.

20. The method of claim 18, wherein the desiccating agent is formed between the glass strengthener and the terminal unit.

* * * * *